United States Patent
Tsai

(10) Patent No.: US 8,254,735 B2
(45) Date of Patent: Aug. 28, 2012

(54) OPTICAL FIBER COUPLER

(75) Inventor: George Tsai, San Jose, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 370 days.

(21) Appl. No.: 12/565,124

(22) Filed: Sep. 23, 2009

(65) Prior Publication Data

US 2011/0069927 A1     Mar. 24, 2011

(51) Int. Cl.
    *G02B 6/32*     (2006.01)
(52) U.S. Cl. ............... 385/33; 385/15; 385/31; 385/36; 385/39
(58) Field of Classification Search .................... 385/15, 385/31, 33, 36, 39
    See application file for complete search history.

(56) References Cited

U.S. PATENT DOCUMENTS

| | | | |
|---|---|---|---|
| 6,437,929 B1 * | 8/2002 | Liu ................................ | 359/819 |
| 6,522,467 B1 * | 2/2003 | Li et al. ..................... | 359/484.02 |
| 7,215,853 B2 * | 5/2007 | Morita et al. ................... | 385/47 |
| 7,359,114 B2 * | 4/2008 | Sauter et al. .................. | 359/353 |
| 2004/0146241 A1 | 7/2004 | Deladurantaye et al. | |
| 2009/0136178 A1 | 5/2009 | Pirastu | |
| 2011/0064406 A1 * | 3/2011 | Wen et al. ....................... | 398/45 |

* cited by examiner

*Primary Examiner* — Jennifer Doan

(57) ABSTRACT

A coupling device includes a fiber collimator, a wedge window pair and a plane window for coupling a light beam provided by a beam source to optical fiber. The fiber collimator is mounted to a base plate and includes a collimator lens, an end of the optical fiber being positioned at a focal point of the collimator lens. The wedge window pair is mounted to the base plate, and is configured to adjust the light beam to be parallel to an optical axis of the fiber collimator. The plane window is mounted to the base plate between the wedge window pair and the fiber collimator. The plane window is configured to align the parallel direction of the light beam with the optical axis of the fiber collimator.

20 Claims, 3 Drawing Sheets

OPTICAL FIBER COUPLER

BACKGROUND

Optical fiber couplers are used to couple collimated light beams from light sources, such as lasers, to optical fiber for transmission. To enable proper coupling, an optical fiber coupler includes adjustable optics that generally align a received light beam with an optical axis of a fiber collimator, used to direct the light beam into the optical fiber. Conventional optical fiber couplers are designed to be readjusted when combined with a light source in order to align the adjustable optics on a case-by-case basis. Therefore, precision adjustment tooling is typically built into conventional optical fiber couplers, which increases cost. Likewise, expensive tooling is often required to fabricate conventional optical fiber couplers.

Further, in addition to being expensive, conventional optical fiber couplers typically have numerous mechanical parts and interdependent alignment axes, which make alignment of received light beams difficult. For example, the bases to which the adjustable optics are mounted may include separate base plates and connectors that are movable with respect to one another and/or the adjustable optics. Much of the alignment must be performed manually due to the nature of the adjustment tooling. For example, conventional optical fiber couplers may include various types of adjustment, set and locking screws for manipulating the adjustable optics. In addition, once the adjustable optics are preliminarily aligned, they typically must be locked in position by various mechanical locking mechanisms. Otherwise, conventional optical fiber couplers are particularly sensitive to shock and vibration if not locked. However, operation of the mechanical locking mechanisms often causes misalignment of the previously aligned adjustable optics.

SUMMARY

In a representative embodiment, a coupling device includes a fiber collimator, a wedge window pair and a plane window for coupling a light beam provided by a beam source to optical fiber. The fiber collimator is mounted to a base plate and includes a collimator lens, an end of the optical fiber being positioned at a focal point of the collimator lens. The wedge window pair is mounted to the base plate, and is configured to adjust the light beam to be parallel to an optical axis of the fiber collimator. The plane window is mounted to the base plate between the wedge window pair and the fiber collimator. The plane window is configured to align the parallel direction of the light beam with the optical axis of the fiber collimator.

In another representative embodiment, a device includes an integrated base plate having a protruding portion defining multiple machined groove segments and a light source mounted on the base plate adjacent to the protruding portion, the light source emitting a collimated light beam. The device further includes a pair of prisms, a plane window ball and a fiber collimator. The pair of prisms is mounted in a first groove segment of the multiple groove segments, the pair of prisms being configured to adjust the emitted light beam received from the light source in two axes of tilt. The plane window ball is mounted in a second groove segment of the multiple groove segments, the plane window ball being configured to translate the adjusted light beam received from the pair of prisms in two axes of translation. The fiber collimator is mounted in a third groove segment of the multiple groove segments and including a collimator lens, the fiber collimator being configured to focus the translated light beam received from the plane window ball onto an end of optical fiber positioned at a focal point of the collimator lens. The translated light beam is co-linear with an optical axis of the fiber collimator, defined by the collimator lens and a location of the end of the optical fiber in a focal plane.

In another representative embodiment, a multi-beam combining device includes input optical fiber couplers configured to couple corresponding light beams having different wavelengths to a wavelength combiner, the wavelength combiner combining the light beams into a single combined light beam; and an output optical fiber coupler configured to couple the combined light beam to an output optical fiber. The output optical fiber coupler includes an output fiber collimator mounted to a base plate and having a collimator lens and an optical axis defined by the collimator lens, a proximal end of the output optical fiber being positioned at a focal point of the collimator lens. Each of the input optical fiber couplers includes a wedge window pair and a plane ball window. The wedge window pair is mounted to the base plate, and is configured to adjust the corresponding light beam to be parallel to the optical axis of the output fiber collimator. The plane window ball is mounted to the base plate between the wedge window pair and the wavelength combiner, and is configured to align the parallel light beam with the optical axis of the output fiber collimator, so that the aligned light beam is co-linear with the optical axis of the output fiber collimator.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
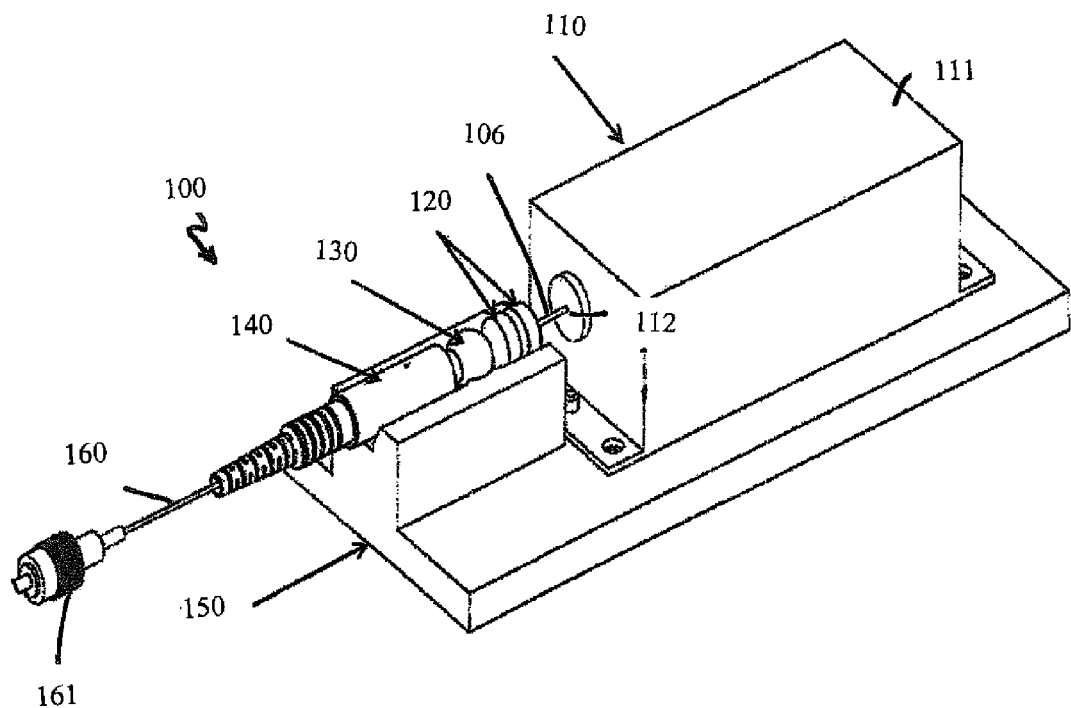
FIG. 1 is a perspective view of an optical fiber coupler, according to a representative embodiment.

In the following detailed description, for purposes of explanation and not limitation, representative embodiments disclosing specific details are set forth in order to provide a thorough understanding of the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the representative embodiments. Such methods and apparatuses are clearly within the scope of the present teachings.

Generally, it is understood that the drawings and the various elements depicted therein are not drawn to scale. Further, relative terms, such as "above," "below," "top," "bottom,"

"upper" and "lower" are used to describe the various elements' relationships to one another, as illustrated in the accompanying drawings. It is understood that these relative terms are intended to encompass different orientations of the device and/or elements in addition to the orientation depicted in the drawings. For example, if the device were inverted with respect to the view in the drawings, an element described as "above" another element, for example, would now be below that element.

Figure 2:
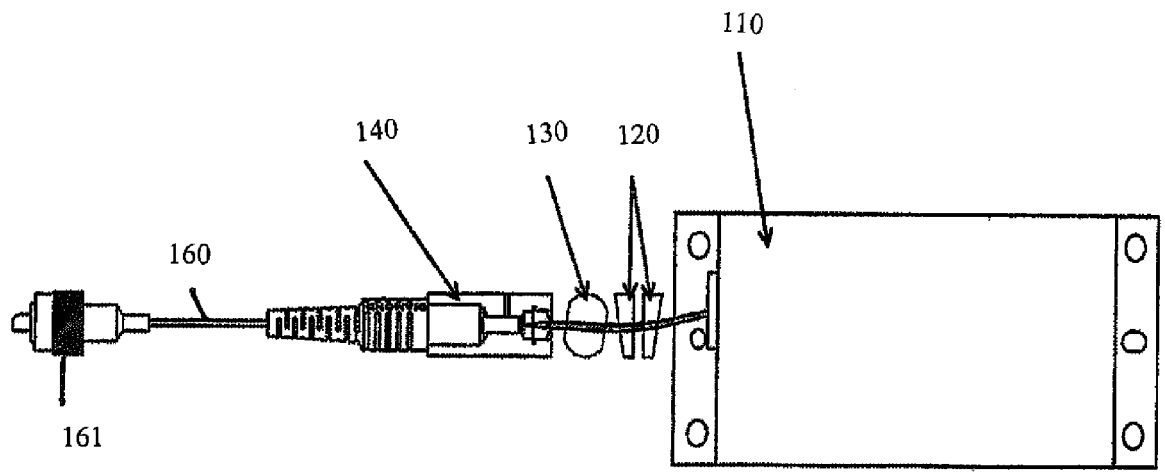
FIG. 2 is a perspective view of a base plate of an optical fiber coupler, according to a representative embodiment.

FIG. 1 is perspective views of an optical fiber coupler, according to representative embodiments. FIG. 2 is a top plan view of an optical fiber coupler, according to a representative embodiment, with the optical coupling portion sectioned.

Referring to FIGS. 1 and 2, the illustrative optical fiber coupler 100 allows a collimated beam of light from a light source 110 to be efficiently coupled to an optical fiber 160. The light source 110 may include any active or passive source of a (collimated) light beam 106, such as a laser or a fiber collimator (not shown). For example, the light source 110 may be a free space laser having a housing 111 and a laser aperture 112 through an exterior wall of the housing 111. A laser beam emitted by the laser propagates through free space and emerges from the housing 111 through the aperture 112 to couple to optical fiber 160 via the optical fiber coupler 100. The optical fiber 160 can be any type of fiber, such as a multi-mode fiber, a single mode fiber, or a polarization maintaining (PM) single mode fiber, for example. The optical fiber 160 is connectable to other optical devices and/or circuits via representative connector 161.

The optical fiber coupler 100 includes optical components located in the optical path of the beam 106 substantially along a longitudinal axis (or x-axis) of the optical fiber coupler 100. The optical components include prism pair or wedge window pair 120, plane window 130 and pre-aligned fiber collimator 140 collimated for the wavelength of the beam 106. The optical fiber coupler 100 further includes base plate 150 configured to position the light source 110, the wedge window pair 120, the plane window 130 and the collimator 140 in appropriate alignment. The optical components and the base plate 150 may be fabricated from any of a variety of materials. In an embodiment, the materials are compatible with one another with respect to thermal expansion, for example, in order to maintain precision alignment of the optical components which are mounted to the base plate 150, as discussed below. For example, the wedge window pair 120 and plane window 130 may be formed from optical glass, such as optical BK7 glass, and the base plate 150 may be formed from a metal, such as type 416 stainless steel, which have compatible thermal expansion coefficients.

Figure 3:
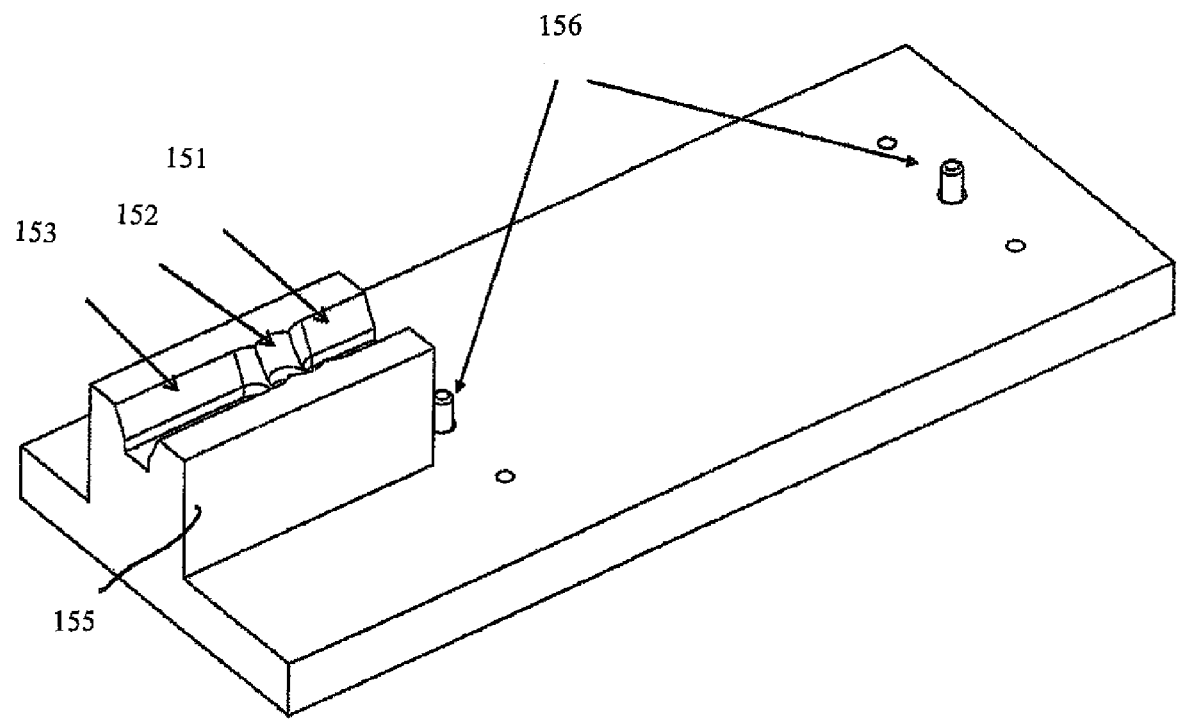
FIG. 3 is a top plan view of an optical fiber coupler, according to a representative embodiment.

FIG. 3 is a perspective view of the base plate 150, according to a representative embodiment. Referring to FIG. 3, the base plate 150 includes protruding portion 155 which has a segmented channel or groove for supporting the wedge window pair 120, the plane window 130 and the collimator 140. For example, groove segment 151 may be a machined groove (e.g., V-groove, rounded groove, or the like) in which the wedge window pair 120 is positioned, groove segment 152 may be a machined groove (e.g., cone-shaped groove) in which the plane window 130 is positioned, and groove segment 153 may be a machined groove (e.g., V-groove, rounded groove, or the like) in which the pre-aligned fiber collimator 140 is positioned. The base plate 150 also includes representative mounting features 156 for mounting the light source 110 in a fixed relationship with the protruding portion 155, the groove or groove segments defined therein, and/or the aligned wedge window pair 120, plane window 130 and collimator 140. The mounting features 156 may include, for example, mechanical protrusions or screws aligned with connecting holes (not shown) on a bottom surface of the light source 110, although other types of mounting features 156 may be incorporated without departing from the scope of the present teachings.

In an embodiment, the base plate 150 is a monolithic or otherwise fully integrated base plate, e.g., which is machined and/or assembled as a unit. Accordingly, the base plate 150 itself does not have movable parts that require adjustment with respect to one another, or with respect to the optical components of the optical fiber coupler 100.

Figure 4:
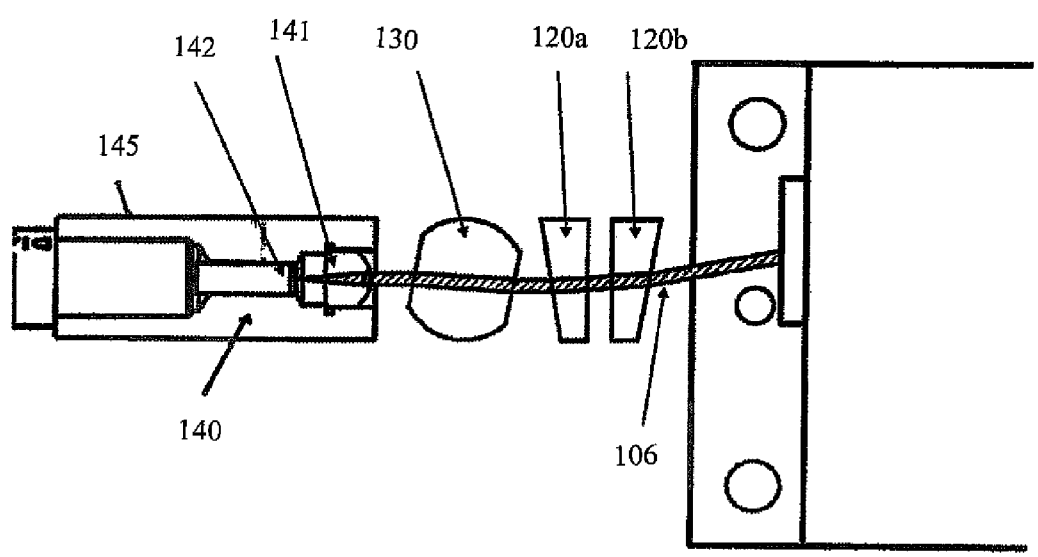
FIG. 4 is a top plan view of an optical fiber coupler, according to a representative embodiment.

FIG. 4 is a detailed top plan view of the section optical coupling portion of FIG. 2, according to a representative embodiment. Referring to FIG. 4, the fiber collimator 140 is a pre-aligned fiber pigtailed collimator, for example, and includes collimator lens 141 and ferrule 142 located within cylindrical collimator body 145. An optical axis of the collimator 140 is defined by the lens 141 and the location of a proximal end of the optical fiber 106 on a focal plane of the collimator 140, discussed below. The optical axis extends substantially parallel to a mechanical center line of the fiber collimator 140 and/or the ferrule 142. In an embodiment, the effective focal length (EFL) of the lens 141 is optimized for maximum coupling. For example, the optimal EFL is approximately equal to the diameter of the beam 106 divided by two times the numerical aperture (NA) of the optical fiber 160 (i.e., diameter$_{beam}$/2*NA$_{fiber}$).

The ferrule 142 locates the proximal end of the optical fiber 160 at a focal point of the lens 141 within the fiber collimator 140. More particularly, the proximal end of the optical fiber 160 is located on a focal plane of the collimator 140, where the focal plane is perpendicular to the optical axis of the collimator 140. The lens 141 may have an optical axis collinear with the mechanical axis of the collimator body 145, and the optical axis of the collimator 140 may be collinear with the mechanical axis of the collimator body 145, in which case the optical axis of the beam 106 and the optical fiber 106 also would be collinear with the mechanical axis of the collimator body 145. However, when the optical fiber 106 is not collinear with the optical axis of the lens 141, for example, the optical axis of the collimator 140 is not collinear with the mechanical axis of the collimator body 145, although it is parallel. The angular deviation of the optical axis of the collimator 140 to the mechanical axis of the collimator body 145 is the vertical displacement of the proximal end of the optical fiber 106 (located on the focal plane) from the optical axis of the lens 141 divided by the focal length of the lens 141.

The wedge window pair 120 is a first beam steering device that includes two rotatable wedge windows 120a and 120b, having equal wedge angles, for redirecting the beam 106 by refraction. The refracting angle of each wedge window 120a and 120b is about 1 degree, for example. Generally, the value of the wedge angle is chosen to compensate for the maximum amount of angular adjustment needed in the optical fiber coupler 100. Too much wedge angle may be non optimal because the adjustment resolution will be decreased. Too little wedge angle will result in insufficient range for the wedge window pair 120 to compensate for the misalignment. In other words, the wedge angle is selected to compensate for the maximum expected angular misalignment between the light source 110 and the optical axis of the collimator 140. In an embodiment, the wedge window pair 120 is a Risley prism.

Generally, the wedge window pair 120 is used to adjust the beam 106 in two axes of tilt (e.g., azimuth angle and elevation angle), so that the beam 106 is parallel to the optical axis of the fiber collimator 140. For example, when the wedge windows 102a and 120b rotate around their cylindrical axis in the same direction by the same angle, the azimuth angle of the beam 106 is deviated by that angle. When the wedge windows 120a and 120b are rotated by an equal but opposite angle, the elevation angle of the beam 106 is deviated as a function of that angle. In various embodiments, the azimuth angle can be adjusted over a 360 degree range. The range of the elevation angle is determined by the wedge angle and the index of refraction of the wedge material of the wedge windows 120a and 120b. The wedge windows 120a and 120b are thus configured to rotate the beam 106 left and right (about an imaginary vertical y-axis) and up and down (about an imaginary z-axis extending perpendicular to the vertical y-axis and an imaginary horizontal x-axis).

In the representative embodiment shown in FIG. 4, each of the wedge windows 120a and 120b has a substantially trapezoidal cross-sectional shape. The wedge windows 120a and 120b can be arranged such that the adjacent sides (facing one another) are parallel and the opposite sides are angled in relation to the parallel sides at equal but opposite angles. Each of the wedge windows 120a and 120b may be independently rotatable, e.g., in opposite directions, about a center axis (which is substantially parallel to the optical axis of the collimator 140, assumed to substantially correspond to the imaginary horizontal x-axis in the depicted embodiment), enabling the wedge windows 120a and 120b to appropriately adjust the direction of the beam 106. Of course, in various embodiments, the wedge windows 120a and 120b may have alternative arrangements with respect to one another and/or cross-sectional shapes other than trapezoids, such as right triangles, similarly positioned to enable steering or adjustment the beam 106, without departing from the scope of the present teachings.

The plane window 130 is second beam steering device used to shift or translate the beam 106 in one or two axes of translation, while preserving the parallel direction of the beam 106 invoked by the wedge window pair 120, so that the beam 106 enters the collimator 140 co-linear with the optical axis of the collimator 140. Coupling efficiency is optimized when the beam 106 is co-linear with the optical axis of the collimator 140, enabling the beam 106 to efficiently enter the proximal end of the optical fiber 160 at the ferrule 142.

As shown in FIGS. 1, 3 and 4, the plane window 130 may be formed from an optical grade glass ball or truncated sphere having opposing planar surfaces that are substantially parallel to one another. The plane window 130 is rotatable around at least two orthogonal axes that are perpendicular to beam 106 in order to appropriately adjust the beam 106. Of course, various embodiments may include alternative shapes of the plane window 130 to enable beam steering to shift or translate the beam 106, without departing from the scope of the present teachings.

The positioning of the optical components (e.g., the wedge window pair 120, the plane window 130 and the collimator 140) with respect to one another and the emerging beam 106 must be relatively precise in order to optimize coupling efficiency of the beam 106. During the assembly process, these optical components are secured to the monolithic base plate 150 to accommodate the alignment optics, resulting in a substantially monolithic optical fiber coupler 100.

According to an embodiment, the assembly of the optical fiber coupler 100 and the coupling process are performed as follows. First, the light source 110 and the collimator 140 are mounted to the base plate 150. The light source 110 may be positioned on the mounting features 156 and the collimator 140 may be positioned using groove 153. The collimator 140 may be clamped (not shown) in place or mounted with an adhesive, such as an ultra violet (UV) cure adhesive, two-part epoxy, or some other type of adhesive.

Second, the plane window 130 is initially placed in (cone-shaped) groove 152 and the wedge window pair 120 is placed in groove 151. The plane window 130 is first roughly aligned with a plane window perpendicular to the collimator 140.

Third, alignment of the optical components is performed by manipulating the wedge windows 120a and 120b of the wedge window pair 120 to adjust tilt, and manipulating the plane window 130 to adjust translation. The alignment process may be automated or performed manually, in whole or in part. For example, a vacuum manipulator (not shown) may be used to manipulate the wedge windows 120a and 120b and the plane window 130, such that a vacuum physically holds the wedge windows 120a and 120b and the plane window 130 in place relative to one another during the alignment process. The vacuum manipulator may be controlled automatically, for example, by a computer or processor operating stepper motors, DC motors, piezo-actuators, or other drive mechanisms. The vacuum manipulator may likewise be controlled manually, for example, by manipulating the positioning of the vacuum manipulator by hand or by using a manual interface of the computer or processor. For example, the stepper motors, DC motors, piezo-actuators, or other drive mechanisms, may be manually controlled through a software interface (e.g., LabView), a thumbwheel interface, a joy stick interface or other user interface. In various embodiments, the vacuum manipulator may likewise be used to manipulate the collimator 140.

Fourth, the fiber coupling is optimized, using any of a variety of algorithms. For example, coupling automation may be based on feedback from measuring power out of the collimator 140. In other words, the wedge windows 120a and 120b and the plane window 130 may be adjusted until the power out of the fiber 160 connected to the collimator 140 is at a maximum. During the adjustment process, the wedge windows 120 and 120b and the plane window 130 are lifted slightly (e.g., by the vacuum manipulator assembly), just enough so that they are no longer in contact with the base plate 150 and/or surfaces of grooves 151 and 152, respectively.

Fifth, while the wedge windows 120 and 120b and the plane window 130 are in the lifted state (e.g., with the vacuum engaged), adhesive may be applied to contact areas with the base plate 150. For example, the adhesive can be UV cure adhesive, two-part epoxy, or some other type of adhesive. Once the adhesive is in place, the wedge windows 120 and 120b and the plane window 130 are lower in place (e.g., by lowering the vacuum manipulator assembly), so that they are in contact with the base plate 150 and the adhesive. The power out of the optical fiber 160 may be again measured to verify that it has not changed, indicating that the fiber coupling remains optimized. The adhesive is then cured, e.g., over time or using UV light, heat, or the like. The optical fiber coupler 100, which is formed as a monolithic unit with the base plate 150 and/or the light source 110, is complete.

Figure 5:
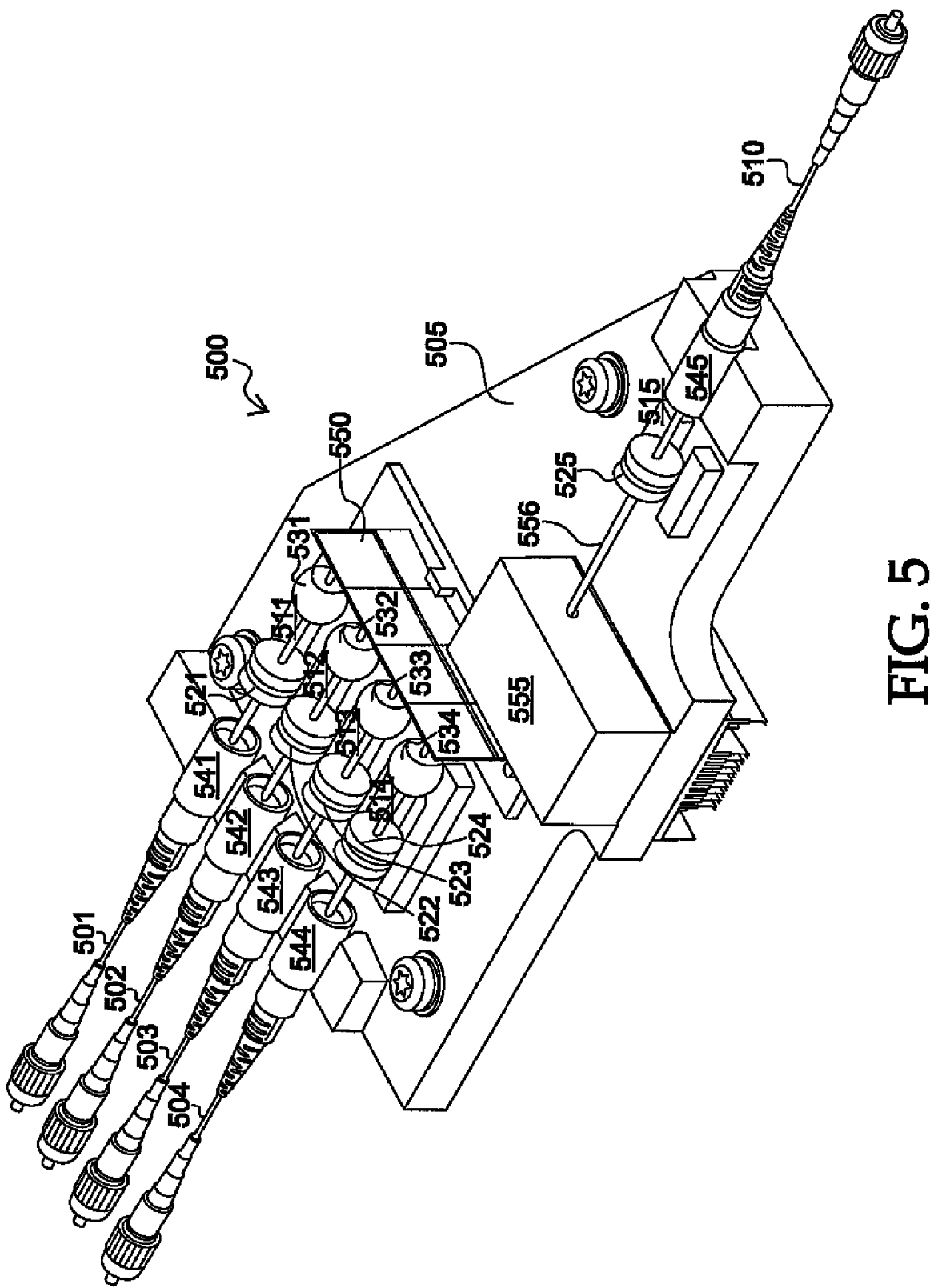
FIG. 5 is a perspective view of a combiner assembly including multiple optical fiber couplers, according to a representative embodiment.

The optical fiber coupler, according to various embodiments, may be used in a multi-channel combiner configuration, in which multiple light beams having different respective wavelengths are combined into a single optical fiber. FIG. 5 is a perspective view of an illustrative combiner assembly, including multiple optical fiber couplers, according to a representative embodiment.

Referring to FIG. 5, the general design of the optical fiber coupler 100 can be incorporated in an easily scalable compact multi-channel device, such as four-channel multi-wavelength or multi-beam combiner 500. The combiner 500 includes four input optical fiber couplers 511-514 and one output optical fiber coupler 525, for combining four beams having different wavelengths, received via optical fibers 501-504. In the depicted embodiment, each of the optical fiber couplers 511-514 is configured to provide monolithic optics, so that the tilt and translation of each of the corresponding four beams may be adjusted provide maximum coupling efficiency into the single output fiber 560. It is understood that in various embodiments, more or fewer than four optical fiber couplers may be included in the combiner without departing from the scope of the disclosure.

More particularly, each of the optical fiber couplers 511-514 is configured in accordance with representative embodiments, e.g., as discussed above with reference to FIGS. 1-4. For example, the optical fiber couplers 511-514 respectively include wedge window pairs 521-524, plane windows 531-534 and fiber collimators 541-544 positioned in corresponding grooves or groove segments of combiner base plate 505 in parallel with one another. The window pairs 521-524 and the plane windows 531-534 are adjusted, so that the corresponding beams projected by collimators 541-544 are each co-linear with the optical axis of output collimators 545, as discussed below.

The adjusted beams from the optical fiber couplers 511-514 are input to rhomboid/prism 550, which combines the beams into a single light beam having combined wavelengths. In an embodiment, the single light beam may be provided to a tunable filter 555, which may be configured to select and/or modulate any combination of the combined wavelengths independently and to adjust power. For example, the tunable filter 555 may be an acousto-optic tunable filter (AOTF) or a poly-chromatic acousto-optic modulator (PC-AOM). Accordingly, a filtered beam 556 emerges from an aperture in the tunable filter 555. In various embodiments, the combiner 500 does not include the tunable filter 555, without departing from the present teachings.

The beam 556 enters the output optical fiber coupler 515, which includes wedge window pair 525 and fiber collimator 545, which are configured substantially the same as the wedge window pair 120 and collimator 140, discussed above with reference to FIGS. 1, 2 and 5. The wedge window pair 525 is manipulated to adjust the effective optical axis of the optical fiber coupler 515 to be close to the theoretical optical axis of a perfectly aligned fiber collimator. Due to its proximity to the collimator 545, the wedge window pair 525 reduces the alignment range required to be implemented by the fiber optical couplers 511-514. However, in various embodiments, the combiner 500 does not include the wedge window pair 525, and all alignment may be performed through manipulation of the wedge window pairs 521-524 and plane windows 531-534 in optical fiber couplers 511-514, without departing from the present teachings.

Coupling efficiency of the combiner 500 is optimized when each of the input beams projected by collimators 541-544 is co-linear with the optical axis of the collimator 545. Such alignment enables the beam 556 to efficiently enter the proximal end of the optical fiber 560 at the ferrule (not shown) of the collimator 545. Therefore, the window pairs 521-524 and the plane windows 531-534 of the optical fiber couplers 511-514 are manipulated as discussed above with respect to FIGS. 1-4 to adjust the tilt and translation of the respective beams, so that they are parallel to and aligned with the optical axis of the receiving collimator 545.

Due to their monolithic nature, the optical fiber coupler 100 and/or combiner 500, according to various embodiments, are more resistant to shock, vibration and temperature changes than conventional optical fiber couplers and combiners. The optical components (e.g., wedge windows 120a and 120b and plane window 130) are bonded in place during the assembly process, and do not need to be further adjusted or manipulated after assembly. Also, the optical components are transmissive, as opposed to reflective. Therefore, they are less sensitive to misalignment, e.g., caused by mechanical instability. Mechanical instability can result from various factors, including temperature, shock, vibration, adhesive instability, etc.

Material costs are less because the optical fiber coupler 100 and/or combiner 500 have fewer parts than corresponding conventional devices, and the adjustment mechanisms and processes are not part of the product cost. When the alignment processes of the optical fiber coupler 100 and/or combiner 500 are automated, as discussed above, the alignment processes do not depend on highly skilled operators, and thus labor costs are reduced.

In addition, the optical fiber coupler 100 and/or combiner 500, according to various embodiments, have simple monolithic machined base plates 150 and 505, respectively, to which the optical components are secured after alignment. The resulting monolithic optical fiber couplers may be included in various base products, which reduces costs. Also, the base plates 150 and/or 505 are machined prior to the addition and bonding of the optical components, after which additional manipulation, adjustment an assembly of the base plates are not needed. Notably, the beam adjusting or steering optical components (e.g., wedge windows 120a and 120b and plane window 130) may be leveraged into any optical system that requires tilt and translation alignment.

The optical fiber coupler 100 and/or combiner 500, according to various embodiments, are not designed to be readjusted after assembly, and thus no precision adjustment tooling need be built in, as in the case of conventional optical aligners. Rather, the precision adjustment tooling for the optical fiber coupler 100 and/or combiner 500 is part of the assembly tooling. Therefore, the overall costs of the optical fiber coupler 100 and/or combiner 500 are relatively low because there are no precision adjuster parts in the assembly. Also, the optical fiber coupler 100 and/or combiner 500 are more stable since all of the beam manipulation is accomplished with transmissive optics, and are relatively insensitive to shock and vibration because there are no sensitive kinematic mounts, for example. In addition, there is no possibility of misalignment when "locking" because all alignment optics are bonded after alignment with a stable adhesive (e.g., UV adhesive) instead of being locked using a locking screw or similar mechanical attachment. Features for beam manipulation optics mounting can be integrated into the light source (laser) mount or beam combiner base for little extra cost.

The various components, materials, structures and parameters are included by way of illustration and example only and not in any limiting sense. In view of this disclosure, those skilled in the art can implement the present teachings in determining their own applications and needed components, materials, structures and equipment to implement these applications, while remaining within the scope of the appended claims.

The invention claimed is:

1. A coupling device for coupling a light beam provided by a beam source to optical fiber, the coupling device comprising:
   a fiber collimator mounted to a base plate and comprising a collimator lens, an end of the optical fiber being positioned at a focal point of the collimator lens;
   a wedge window pair mounted to the base plate, the wedge window pair being configured to adjust the light beam to be parallel to an optical axis of the fiber collimator; and a plane window mounted to the base plate between the wedge window pair and the fiber collimator, the plane window being configured to align the parallel direction of the light beam with the optical axis of the fiber collimator.

2. The coupling device of claim 1, wherein the wedge window pair adjusts azimuth and elevation of the light beam.

3. The coupling device of claim 1, wherein the wedge window pair comprises substantially wedge shaped prisms.

4. The coupling device of claim 3, wherein the prisms are rotatable around a longitudinal access of the optical fiber coupler.

5. The coupling device of claim 3, wherein the wedge window pair is a Risley prism.

6. The coupling device of claim 1, wherein the plane window comprises a truncated sphere having opposing planar surfaces that are substantially parallel to one another.

7. The coupling device of claim 1, wherein the base plate defines a groove positioned between the beam source and the optical fiber.

8. The coupling device of claim 7, wherein the fiber collimator, the wedge window pair and the plane window are mounted in the groove of the base plate using an adhesive.

9. The coupling device of claim 8, wherein the base plate comprises a mounting feature configured to mount the light source in fixed relationship with the fiber collimator, the wedge window pair and the plane window mounted in the groove of the base plate.

10. The coupling device of claim 1, wherein the base plate comprises metal having a first thermal expansion coefficient and each of the wedge window pair and the plane window comprises optical glass having a second thermal expansion coefficient, wherein the first and second thermal expansion coefficients are compatible.

11. A device comprising:
an integrated base plate comprising a protruding portion defining a plurality of machined groove segments;
a light source mounted on the base plate adjacent to the protruding portion, the light source emitting a collimated light beam;
a pair of prisms mounted in a first groove segment of the plurality of groove segments, the pair of prisms being configured to adjust the emitted light beam received from the light source in two axes of tilt;
a plane window ball mounted in a second groove segment of the plurality of groove segments, the plane window ball being configured to translate the adjusted light beam received from the pair of prisms in two axes of translation; and
a fiber collimator mounted in a third groove segment of the plurality of groove segments and comprising a collimator lens, the fiber collimator being configured to focus the translated light beam received from the plane window ball onto an end of optical fiber positioned at a focal point of the collimator lens on a focal plane of the collimator,
wherein the translated light beam is co-linear with an optical axis of the fiber collimator, defined by the collimator lens and the end of the optical fiber in the focal plane.

12. The device of claim 11, wherein the pair of prisms comprises a Risley prism.

13. The device of claim 12, wherein the plane window ball comprises a truncated sphere having opposing planar surfaces that are substantially parallel to one another.

14. The device of claim 13, wherein the light source comprises a laser.

15. A multi-beam combining device, comprising:
a plurality of input optical fiber couplers configured to couple a corresponding plurality of light beams having different wavelengths to a wavelength combiner, the wavelength combiner combining the plurality of light beams into a single combined light beam; and
an output optical fiber coupler configured to couple the combined light beam to an output optical fiber, the output optical fiber coupler comprising an output fiber collimator mounted to a base plate and having a collimator lens and an optical axis defined by the collimator lens, a proximal end of the output optical fiber being positioned at a focal point of the collimator lens,
wherein each of the plurality of input optical fiber couplers comprises:
a wedge window pair mounted to the base plate, the wedge window pair being configured to adjust the corresponding light beam to be parallel to the optical axis of the output fiber collimator; and
a plane window ball mounted to the base plate between the wedge window pair and the wavelength combiner, the plane window ball being configured to align the parallel light beam with the optical axis of the output fiber collimator, so that the aligned light beam is co-linear with the optical axis of the output fiber collimator.

16. The device of claim 15, wherein each of the plurality of input optical fiber couplers further comprises:
a fiber collimator mounted to the base plate and connected between the plane window ball and the wavelength combiner.

17. The device of claim 15, wherein the wavelength combiner comprises a rhomboid/prism.

18. The device of claim 17, further comprising:
a tunable filter configured to receive the combined light beam from the wavelength combiners, and to select a combination of wavelengths of the combined light beam to output to the output optical fiber coupler.

19. The device of claim 17, wherein the wedge window pair of each of the plurality of input optical fiber couplers comprises a Risley prism.

20. The device of claim 19, wherein the plane window ball of each of the plurality of input optical fiber couplers comprises a truncated sphere having opposing planar surfaces that are substantially parallel to one another.

* * * * *